(12) United States Patent
Brown et al.

(10) Patent No.: US 9,550,869 B2
(45) Date of Patent: *Jan. 24, 2017

(54) STYRENE BUTADIENE BLOCK COPOLYMERS FOR FILM APPLICATIONS

(71) Applicant: Chevron Phillips Chemical Company LP, The Woodlands, TX (US)

(72) Inventors: John Mark Brown, The Woodlands, TX (US); Nathan E. Stacy, Houston, TX (US); Carleton E. Stouffer, Bartlesville, OK (US); John D. Wilkey, Spring, TX (US); Michael A. Smith, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,992

(22) Filed: Apr. 15, 2015

(65) Prior Publication Data

US 2015/0218325 A1 Aug. 6, 2015

Related U.S. Application Data

(63) Continuation of application No. 13/682,381, filed on Nov. 20, 2012, now Pat. No. 9,040,628, which is a continuation of application No. 11/609,159, filed on Dec. 11, 2006, now Pat. No. 8,415,429.

(51) Int. Cl.
| | |
|---|---|
| *C08L 53/02* | (2006.01) |
| *C08J 5/18* | (2006.01) |
| *C08F 293/00* | (2006.01) |
| *C08F 297/04* | (2006.01) |
| *C08F 212/08* | (2006.01) |
| *C08F 301/00* | (2006.01) |

(52) U.S. Cl.
CPC ............. *C08J 5/18* (2013.01); *C08F 212/08* (2013.01); *C08F 297/04* (2013.01); *C08F 297/044* (2013.01); *C08F 301/00* (2013.01); *C08L 53/02* (2013.01); *C08J 2325/10* (2013.01); *C08J 2347/00* (2013.01); *C08J 2425/06* (2013.01)

(58) Field of Classification Search
None
See application file for complete search history.

(56) References Cited

U.S. PATENT DOCUMENTS

| 8,415,429 | B2 | 4/2013 | Brown et al. | |
|---|---|---|---|---|
| 9,040,628 | B2 * | 5/2015 | Brown | C08F 297/04 |
| | | | | 525/95 |
| 2004/0102576 | A1 | 5/2004 | Matsui et al. | |
| 2005/0101743 | A1 * | 5/2005 | Stacy | C08F 297/04 |
| | | | | 525/314 |
| 2007/0173605 | A1 * | 7/2007 | Brown | C08F 297/04 |
| | | | | 525/242 |

FOREIGN PATENT DOCUMENTS

| JP | H02206529 | 8/1990 |
|---|---|---|
| JP | H03294318 | 12/1991 |
| JP | H06206953 | 7/1994 |
| JP | H07252335 | 10/1995 |
| JP | H07252336 | 10/1995 |
| JP | H1045858 | 2/1998 |
| JP | H10176069 | 6/1998 |
| JP | H2002105154 | 4/2002 |
| JP | H2006103752 | 4/2006 |
| WO | WO 2005047355 A2 | 5/2005 |
| WO | WO 2008073932 A1 | 6/2008 |

OTHER PUBLICATIONS

Kraus, Gerald, et al. "Morphology and Dynamic Viscoelastic behavior of blends of Styrene-Butadiene Block Copolymers", Adv. Chem. Ser., (1979), 176, pp. 277-292.

Hsieh, Henry L., et al., "Kinetics of Alkyllithium Initiated Polymerizations," Rubber Chemistry and Technology, (1970), 43(1), pp. 22-73.

Knoll, Konrad, et al., "Styrolux and styroflex. From Transparent Impact Polystyrene to New Thermoplastic Elastomers. Syntheses, Applications, and Blends with Other Styrene-Based Polymers", Macromolecular Symposia (1998), 132 (International Symposium on Ionic Polymerization, 1997), pp. 231-243.

JP Office Action 2013-124459 mailed on Apr. 1, 2014, pp. 1-17.

* cited by examiner

*Primary Examiner* — Jeffrey Mullis
(74) *Attorney, Agent, or Firm* — Merchant & Gould P.C.

(57) ABSTRACT

We disclose a monovinylarene-conjugated diene block copolymer containing a plurality of monovinylarene-conjugated diene mixed blocks, wherein each mixed block contains conjugated diene units and monovinylarene units in a weight ratio of about 0.05 to about 0.33. We also disclose a composition containing (a) from about 50 parts by weight to about 95 parts by weight of the monovinylarene-conjugated diene block copolymer and (b) from about 5 parts by weight to about 50 parts by weight of polystyrene; wherein the monovinylarene-conjugated diene block copolymer and the polystyrene total 100 parts by weight. We further disclose a method of shrink-wrapping an object or a group of objects by wrapping the object or the group of objects with a film containing the composition, to yield a wrapped object or group of objects, and heating the wrapped object or group of objects to a temperature and for a duration sufficient to shrink the film in at least a first direction, to yield a shrink-wrapped object or group of objects.

21 Claims, No Drawings

STYRENE BUTADIENE BLOCK COPOLYMERS FOR FILM APPLICATIONS

CROSS-REFERENCE TO RELATED APPLICATION

This application is a continuation application of U.S. patent application Ser. No. 13/682,381, filed on Nov. 20, 2012, now U.S. Pat. No. 9,040,628, which is a continuation application of U.S. patent application Ser. No. 11/609,159, filed on Dec. 11, 2006, now U.S. Pat No. 8,415,429, the disclosures of which are incorporated herein by reference in their entirety.

BACKGROUND OF THE INVENTION

The present invention relates generally to the field of block copolymers. More particularly, it concerns monovinylarene-conjugated diene copolymers useful in shrink film applications, especially in blends with polystyrene.

Articles formed from monovinylarene-conjugated diene copolymers, such as styrene-butadiene copolymers, for example K-Resin® (Chevron Phillips Chemical Company LP, The Woodlands, Tex.), generally have improved physical properties compared to articles formed from general purpose polystyrenes. However, in the case of articles for which heat shrink performance is important, new monovinylarene-conjugated diene copolymers are necessary to provide the shrink performance desired by this growing market. As an example, typical monovinylarene-conjugated diene copolymers possess glass transition temperatures ($T_g$), which are the primary controller of shrink performance, that are typically in the range of about 95° C. to about 108° C. This relatively high $T_g$ is not favored by the marketplace as a relatively high temperature is requires to initiate shrinking.

Further, polystyrene is commonly blended with monovinylarene-conjugated diene copolymers for a wide number of reasons including increase film stiffness and decreased costs. Articles formed from blends of polystyrene and monovinylarene-conjugated diene copolymers can also be used in applications where heat shrink performance is important.

Therefore, it would be desirable to have monovinylarene-butadiene copolymers with lower $T_g$ and improved heat shrink performance, either alone or in blends with polystyrene.

SUMMARY OF THE INVENTION

In one embodiment, the present invention relates to a monovinylarene-conjugated diene block copolymer containing a plurality of monovinylarene-conjugated diene mixed blocks, wherein each mixed block contains conjugated diene units and monovinylarene units in a weight ratio of about 0.05 to about 0.33.

In another embodiment, the present invention relates to a composition containing (a) from about 50 parts by weight to about 95 parts by weight of a monovinylarene-conjugated diene block copolymer comprising a plurality of monovinylarene-conjugated diene mixed blocks, wherein each mixed block contains conjugated diene units and monovinylarene units in a weight ratio of about 0.05 to about 0.33; and (b) from about 5 parts by weight to about 50 parts by weight of polystyrene; wherein the monovinylarene-conjugated diene block copolymer and the polystyrene total 100 parts by weight.

In another embodiment, the present invention relates to a method of shrink-wrapping an object or a group of objects by wrapping the object or the group of objects with a film containing the composition, to yield a wrapped object or group of objects, and heating the wrapped object or group of objects to a temperature and for a duration sufficient to shrink the film in at least a first direction, to yield a shrink-wrapped object or group of objects.

The copolymer and the composition can be used in the production of shrink films.

DESCRIPTION OF ILLUSTRATIVE EMBODIMENTS

In one embodiment, the present invention relates to a monovinylarene-conjugated diene block copolymer containing a plurality of monovinylarene-conjugated diene mixed blocks, wherein each mixed block contains conjugated diene units and monovinylarene units in a weight ratio of about 0.05 to about 0.33. The weight ratio can be defined as phm (parts per hundred monomer over all conjugated diene and monovinylarene monomer charged to the polymer during polymerization) conjugated diene units divided by phm monovinylarene units. Quantities of monomers and monomer units expressed herein are usually in terms of parts per hundred monomer (phm) based on the total weight of monovinylarene monomer and conjugated diene monomer charged during polymerization.

The basic starting materials and polymerization conditions for preparing conjugated diene/monovinylarene block copolymers are disclosed in U.S. Pat. Nos. 4,091,053; 4,584,346; 4,704,434; 4,704,435; 5,227,419; 5,545,690; and 6,096,828, the full disclosures of which are hereby incorporated by reference as if explicitly contained herein.

"Conjugated diene," as used herein, refers to an organic compound containing conjugated carbon-carbon double bonds and a total of 4 to 12 carbon atoms, such as 4 to 8 carbon atoms. Exemplary conjugated dienes include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. In one embodiment, the conjugated diene can be 1,3-butadiene or isoprene. In a further embodiment, the conjugated diene can be 1,3-butadiene. A unit of a polymer, wherein the unit is derived from polymerization of a conjugate diene monomer, is a "conjugated diene unit."

"Monovinylarene," as used herein, refers to an organic compound containing a single carbon-carbon double bond, at least one aromatic moiety, and a total of 8 to 18 carbon atoms, such as 8 to 12 carbon atoms. Exemplary monovinylarenes include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. In one embodiment, the monovinylarene is styrene. A unit of a polymer, wherein the unit is derived from polymerization of a monovinylarene monomer, is a "monovinylarene unit."

In the polymer of the present invention, the monovinylarene-conjugated diene mixed blocks contain conjugated diene units and monovinylarene units. The monovinylarene-conjugated diene mixed blocks may be random or tapered. The mixed block is "tapered" when both (a) the mole fraction of conjugated diene units in a first section of the block is higher than the mole fraction of conjugated diene units in a second section of the block, wherein the second section of the block is closer to a given end of the block and (b) condition (a) is true for substantially all sections of the block. (Depending on the size of the sections being considered, condition (a) may not be true for all sections, but if so, will be not true at no more than about the level expected by chance).

In one embodiment, each mixed block contains conjugated diene units and monovinylarene units in a weight ratio of about 0.06 to about 0.28. In another embodiment, each mixed block contains conjugated diene units and monovinylarene units in a weight ratio of about 0.08 to about 0.26. In another embodiment, each mixed block contains conjugated diene units and monovinylarene units in a weight ratio of about 0.05 to about 0.09. While not wishing to be limited by theory, it is believed that having each mixed block contain the specified weight ratios of conjugated diene units and monovinylarene units provides monovinylarene-conjugated diene copolymers possessing a glass transition temperature below about 100° C. which are suitable for applications requiring heat shrinkability.

In one embodiment, the monovinylarene-conjugated diene block copolymer contains at least three monovinylarene-conjugated diene mixed blocks. In a further embodiment, the monovinylarene-conjugated diene block copolymer contains four or five monovinylarene-conjugated diene mixed blocks.

In one embodiment, the monovinylarene-conjugated diene block copolymer contains four consecutive monovinylarene-conjugated diene mixed blocks. In a further embodiment, the monovinylarene-conjugated diene block copolymer contains five consecutive monovinylarene-conjugated diene mixed blocks.

In addition to the plurality of mixed blocks described above, the monovinylarene-conjugated diene block copolymer can further contain blocks of monovinylarene units, conjugated diene units, random monovinylarene-conjugated diene, stepwise monovinylarene-conjugated diene, mixed monovinylarene-conjugated diene containing more conjugated diene units than a conjugated diene/monovinylarene weight ratio of about 0.33, and other monomers, either alone, in copolymeric blocks, or in combination with monovinylarene units, conjugated diene units, or both.

In one embodiment, the monovinylarene-conjugated diene block copolymer further contains a proximal conjugated diene block. In this context, "proximal" refers to a position nearer the terminal end of the block copolymer than the initial end. In one embodiment, the proximal conjugated diene block contains from about 5 phm conjugated diene units to about 50 phm conjugated diene units, relative to the total amount of monovinylarene units and conjugated diene units in the monovinylarene-conjugated diene block copolymer. In another embodiment, the proximal conjugated diene block contains from about 10 phm conjugated diene units to about 35 phm conjugated diene units. In a further embodiment, the proximal conjugated diene block contains from about 11 phm conjugated diene units to about 25 phm conjugated diene units. While not wishing to be limited by theory, it is believed that having a proximal conjugated diene block containing the specified amount of conjugated diene units provides impact resistance to the monovinylarene-conjugated diene copolymer and blends thereof.

In another embodiment, the monovinylarene-conjugated diene block copolymer further contains a distal monovinylarene block. In this context, "distal" refers to a position nearer the initial end of the block copolymer than the terminal end. In one embodiment, the distal monovinylarene block contains from about 10 phm monovinylarene units to about 40 phm monovinylarene units, relative to the total amount of monovinylarene units and conjugated diene units in the monovinylarene-conjugated diene block copolymer. In a further embodiment, the distal monovinylarene block contains from about 15 phm monovinylarene units to about 35 phm monovinylarene units.

In one embodiment, the monovinylarene-conjugated diene copolymer is a block copolymer comprising styrene blocks and butadiene blocks (a "styrene-butadiene block copolymer"). Exemplary styrene-butadiene copolymers are commercially available under the name K-Resin® (Chevron Phillips Chemical Company, LP, The Woodlands, Tex.).

The monovinylarene-conjugated diene copolymer can have any proportion of monovinylarene units and conjugated diene units. In one embodiment, the monovinylarene-conjugated diene copolymer has from about 50 wt %:50 wt % monovinylarene units:conjugated diene units to about 90 wt %:10 wt % monovinylarene units:conjugated diene units. In one embodiment, the monovinylarene-conjugated diene copolymer has from about 65 wt %:35 wt % monovinylarene units:conjugated diene units to about 85 wt %:15 wt % monovinylarene units:conjugated diene units.

The monovinylarene-conjugated diene copolymer can further comprise other monomers known in the art for inclusion in monovinylarene-conjugated diene copolymers.

Generally, each block is formed by polymerizing the monomer or mixture of monomers from which the desired units of the block are derived. The polymerization process will generally be amenable to a relative lack of change in process parameters between different blocks, but the skilled artisan, having the benefit of the present disclosure, may make some minor changes in process parameters between different blocks as a matter of routine experimentation. The following descriptions of the polymerization process will generally apply to the formation of all types of blocks in the inventive polymer, although certain descriptions may be of more or less value to forming one or more of the types of blocks in the inventive polymer.

The polymerization process can be carried out in a hydrocarbon diluent at any suitable temperature in the range of from about −100° C. to about 150° C., such as from about 0° C. to about 150° C., and at a pressure sufficient to maintain the reaction mixture substantially in the liquid phase. In one embodiment, the hydrocarbon diluent can be a linear or cyclic paraffin, or mixtures thereof. Exemplary linear or cyclic paraffins include, but are not limited to, pentane, hexane, octane, cyclopentane, cyclohexane, and mixtures thereof, among others. In one embodiment, the paraffin is cyclohexane.

The polymerization process can be carried out in the substantial absence of oxygen and water, such as under an inert gas atmosphere.

The polymerization process can be performed in the presence of an initiator. In one embodiment, the initiator can be any organomonoalkali metal compound known for use as an initiator. In a further embodiment, the initiator can have the formula RM, wherein R is an alkyl, cycloalkyl, or aryl radical containing 4 to 8 carbon atoms, such as an n-butyl radical, and M is an alkali metal, such as lithium. In a particular embodiment, the initiator is n-butyl lithium.

The amount of initiator employed depends upon the desired polymer or block molecular weight, as is known in the art and is readily determinable, making due allowance for traces of poisons in the feed streams.

An initiator can be charged to the polymerization process once or more than once. When multiple initiator charges are charged to the polymerization process, a particular initiator compound can be used in one, some, or all initiator charges.

The charging of multiple initiator charges to the polymerization process can modify the modality of the final polymer, as will be discussed below.

The polymerization process can further involve the use of a randomizer. In one embodiment, the randomizer can be a polar organic compound, such as an ether, a thioether, or a tertiary amine. In another embodiment, the randomizer can be a potassium salt or a sodium salt of an alcohol. The randomizer can be included in the hydrocarbon diluent to improve the effectiveness of the initiator, to randomize at least part of the monovinylarene monomer in a mixed monomer charge, to modify mixing in a mixed monomer charge, or two or more thereof. The inclusion of a randomizer can be of value when forming a mixed monovinylarene-conjugated diene block of the present polymer. Exemplary randomizers include, but are not limited to, dimethyl ether, diethyl ether, ethyl methyl ether, ethyl propyl ether, di-n-propyl ether, di-n-octyl ether, anisole, dioxane, 1,2-dimethoxyethane, 1,2-diethoxypropane, dibenzyl ether, diphenyl ether, 1,2-dimethoxybenzene, tetramethylene oxide (tetrahydrofuran or THF), potassium tert-amylate (KTA), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, N,N-di-methylaniline, N-methyl-N-ethylaniline, N-methylmorpholine, and mixtures thereof, among others.

In one embodiment, the randomizer is tetrahydrofuran. When employing tetrahydrofuran, the tetrahydrofuran is generally present in an amount in the range of from about 0.01 phm to about 1.0 phm, such as from about 0.02 phm to about 1.0 phm.

In another embodiment, the randomizer is potassium tert-amylate (KTA). When employing KTA, the KTA is generally present in an amount in the range of from about 0.001 phm to about 1.0 phm, such as from about 0.004 phm to about 0.4 phm.

When forming a particular block, each monomer charge or monomer mixture charge can be polymerized under solution polymerization conditions such that the polymerization of each monomer charge or monomer mixture charge, to form the particular block, is substantially complete before charging a subsequent charge. "Charging," as used herein, refers to the introduction of a compound to a reaction zone, such as the interior of a reactor vessel.

Though not to be bound by theory, if an initiator is included in a charge, a block will typically form either de novo or by addition to the end of an unterminated, previously-formed, block. Further not to be bound by theory, if an initiator is not included in a charge, a block will typically only form by addition to the end of an unterminated, previously-formed, block.

A coupling agent can be added after polymerization is complete. Suitable coupling agents include, but are not limited to, di- or multivinylarene compounds; di- or multiepoxides; di- or multialkoxysilanes; di- or multiisocyanates; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures of two or more such compounds, among others.

Useful multifunctional coupling agents include, but are not limited to, epoxidized vegetable oils such as epoxidized soybean oil, epoxidized linseed oil, and mixtures thereof, among others. In one embodiment, the coupling agent is epoxidized soybean oil. Epoxidized vegetable oils are commercially available under the trademark Vikoflex® from Arkema Inc. (Philadelphia, Pa.).

If coupling is to be performed, any effective amount of the coupling agent can be employed. In one embodiment, a stoichiometric amount of the coupling agent relative to active polymer alkali metal tends to promote maximum coupling. However, more or less than stoichiometric amounts can be used for varying coupling efficiency where desired for particular products.

Following completion of the coupling reaction, if any, the polymerization reaction mixture can be treated with a terminating agent such as water, carbon dioxide, alcohol, phenols, linear saturated aliphatic mono-dicarboxylic acids, or mixtures thereof, to remove alkali metal from the block copolymer or for color control.

After termination, if any, the polymer cement (polymer in polymerization solvent) usually contains about 10 to about 40 weight percent solids, more usually about 20 to about 35 weight percent solids. The polymer cement can be flashed to evaporate a portion of the solvent so as to increase the solids content to a concentration of about 50 to about 99 weight percent solids, followed by vacuum oven drying, a devolatilizing extruder, a wiped film evaporator, or other methods of removing the remaining solvent.

The block copolymer can be recovered and worked into a desired shape, such as by sheet extrusion, cast film extrusion, blown film, or injection molding. The block copolymer can also contain additives such as antioxidants, antiblocking agents, release agents, fillers, extenders, and dyes, and the like.

In an embodiment, the monovinylarene-conjugated diene copolymer further comprises a rubber modified polystyrene. An exemplary rubber modified polystyrene is a high-impact polystyrene (HIPS). A rubber modified polystyrene is a composition comprising any graft copolymer of styrene and rubber. By "graft copolymer" is meant polystyrene produced by polymerizing styrene in the presence of an unsaturated rubber wherein some amount of free radicals react with the rubber producing polystyrene chains that are covalently bonded to the rubber. During this process the rubber, grafted with polystyrene, becomes dispersed throughout the polystyrene in the form of discrete domains. In one embodiment the unsaturated rubber is polybutadiene. A suitable high-impact polystyrene is available from Chevron Phillips Chemical Company LP (The Woodlands, Tex.) with the designation EA8100. Generally, a composition further comprising a rubber modified polystyrene can contain from about 0.1 phm rubber modified polystyrene to about 5 phm rubber modified polystyrene, such as about 2 phm rubber modified polystyrene The rubber modified polystyrene may be used in some embodiments as an antiblocking agent.

In the present invention, the monovinylarene-conjugated diene block copolymer can be monomodal, that is, a population of copolymer molecules can have one peak in a histogram of the population's molecular weight distribution, or it can be polymodal, that is, have two or more peaks in a histogram of the copolymer molecules' population's molecular weight distribution. Though not to be bound by theory, the charging of multiple initiator charges will tend to yield polymer chains of different lengths and thus will tend to have different molecular weights. In addition, and again not to be bound by theory, use of a coupling agent will tend to yield coupled chains formed by coupling different numbers of chains of the same or different lengths, and thus the coupled chains will tend to have different molecular weights.

In the present invention, the monovinylarene-conjugated diene copolymer can be coupled or uncoupled, as described above.

In specific polymerization processes, typical initiator, monomer and monomer mixture charge sequences include, but are not limited, charge orders selected from the group consisting of i-C-C-i-C-B-CA, i-C-C-C-i-C-C-B-CA, i-A-C-C-C-C-B-CA, i-A-i-C-C-C-C-B-CA, i-A-i-C-C-C-C-CA, i-A-i-C-C-C-C-C-B-CA, and i-A-C-C-i-C-C-B-CA, wherein i is a polymerization initiator charge, A is a monovinylarene charge, B is a conjugated diene charge, C is a monovinylarene and conjugated diene charge, and CA is a coupling agent. In a further embodiment, charge order is selected from the group consisting of i-C-C-i-C-B-CA, i-C-C-C-i-C-C-B-CA, i-A-C-C-C-C-B-CA, i-A-i-C-C-C-C-B-CA, i-A-i-C-C-C-C-B-CA, and i-A-C-C-i-C-B-CA.

In one embodiment, the conjugated diene-monovinylarene block copolymer can be formed into a film or a sheet. A typical extruded sheet can have a thickness of about 10 mils. In a further embodiment, a sheet can be stretched in at least one direction at a temperature from about 50° C. to about 100° C., such as about 90° C. to form a film having a thickness of about 0.5 mil to about 3 mil, such as about 2 mil. In this embodiment, the film formed from the conjugated diene-monovinylarene block copolymer may have a shrinkage in at least one direction of at least about 40% at about 100° C. In one embodiment, the film formed from the conjugated diene-monovinylarene block copolymer may have a shrinkage in at least one direction of at least about 60% at about 100° C., such as at least about 70% at 100° C., such as from about 71% to about 76% at 100° C. Also, the film formed from the conjugated diene-monovinylarene block copolymer may have a haze of less than about 10%. In one embodiment, the film formed from the conjugated diene-monovinylarene block copolymer may have a haze of less than about 6%. Also, the film formed from the conjugated diene-monovinylarene block copolymer may have a natural shrinkage of less than about 10% after 7 days. In one embodiment, the film formed from the conjugated diene-monovinylarene block copolymer may have a natural shrinkage of less than about 7% after 7 days.

In another embodiment, the present invention relates to a composition containing (a) from about 50 parts by weight to about 95 parts by weight of a monovinylarene-conjugated diene block copolymer comprising a plurality of monovinylarene-conjugated diene mixed blocks, wherein each mixed block contains conjugated diene and monovinylarene in a weight ratio of about 0.05 to about 0.33; and (b) from about 5 parts by weight to about 50 parts by weight of polystyrene; wherein the monovinylarene-conjugated diene block copolymer and the polystyrene total 100 parts by weight.

The block copolymer can be as described above. As used herein, "polystyrene" or "PS" refers to any homopolymer containing styrene units and does not include HIPS as described above. Suitable polystyrenes are available from Chevron Phillips Chemical Company LP (The Woodlands, Tex.) with the designations D4049, EA3400, EA3710, MC3200, and MC3600.

In one embodiment, the composition contains from about 70 parts by weight to about 95 parts by weight of the monovinylarene-conjugated diene block copolymer and from about 5 parts by weight to about 30 parts by weight of polystyrene.

In one embodiment, the composition may further comprise a rubber modified polystyrene as previously described. The rubber modified polystyrene may be used in some embodiments as an antiblocking agent.

In one embodiment, the composition can be formed into a film or a sheet. A typical extruded sheet can have a thickness of about 10 mils. In a further embodiment, a sheet can be stretched in at least one direction at a temperature from about 50° C. to about 100° C., such as about 90° C. to form a film having a thickness of about 0.5 mil to about 3 mil, such as about 2 mil. In this embodiment, the film formed from the composition may have a shrinkage in at least one direction of at least about 40% at about 100° C. Also, the film formed from the composition may have a haze of less than about 10%. Also, the film formed from the composition may have a natural shrinkage of less than about 5% after 7 days.

The film or sheet can be produced by any technique known in the art of monolayer and coextrusion. Such techniques include, cast film extrusion, blown film extrusion, and sheet extrusion; either as a single extruded layer or a plurality of coextruded layers. Generally, the film can be produced by cast film or sheet extrusion techniques. For example, the film can be produced using conventional extrusion techniques such as a coextruded cast film. In coextrusion, two or more polymers are simultaneously extruded through one die. Two or more extruders are used simultaneously to feed the die. In this process, various polymer melts are introduced into the die under conditions of laminar flow such that there is no intermixing, but bonding occurs at the interface between the film layers.

In a cast film extrusion process, molten material from an extruder flows through a flat die directly onto a casting roll, which cools the molten material. Generally, cast film processes produce films with an average thickness of about 10 mils or less, however the process can be used to produce films thicker than 20 mils. In one embodiment, orientation can be introduced into the film prior to winding on the final drum. In another embodiment, the film may be wound onto mill roll and orientation can be introduced into the film by passing the film through a separate orientation process line.

In a sheet extrusion process, molten material from an extruder flows through a flat die to form a sheet which is passed through a chill roll stack. Chill roll stacks typically consist of at least three cooled rolls. Typically the sheet process differs from the cast film process in that the sheet produced has a thickness of between about 5 mils and about 20 mils. This thickness allows the resultant sheet to be oriented in the transverse as well as machine direction.

In a blown film extrusion process, while the extrusion process upstream of the die is similar to the cast process, the die and downstream are different. In the blown film process, the die is annular (circular) and typically the polymer exits in an upward direction. This produces a cylindrical tube, which can then be closed (collapsed) at the top between nip rolls, resulting in a flattened tube. Subsequently, the tube of film can be reheated, reinflated, and stretched to introduce orientation in the transverse and machine directions. This tube can then be slit and then be wound into one or more rolls of film. This is often referred to as a blown film double bubble process.

Generally, the film has a machine direction, which is parallel to the direction in which the polymer exits the die, and a transverse direction which is perpendicular to the machine direction.

Preparation of shrink films requires the introduction of orientation into the polymer film by any technique known in the art. While not wanting to be bound by any one theory, it is widely believed that the orientation process introduces and fixes stress into the film which is then recovered as shrinkage when the film is later heated. Orientation can be introduced in a step or series of steps immediately after the initial film or sheet production (i.e. in-line) or as a separate post-processing step or steps (i.e. off-line) that may occur at a later date. The orientation can be introduced in at least one direction. One technique to introduce orientation is the use of a tentering frame, generally used to introduce orientation in the transverse direction, often referred to as a TDO machine. The tentering frame achieves this by pulling the film in the transverse direction using a series of clips mounted on a chain that grab the edges of the film. The chain clips stretch the film in the transverse direction, due to the chain riding on divergent chain guides, as the film is heated within a long oven. An alternative orientation technique is the use of a series of temperature controlled rolls, generally used to introduce orientation in the machine direction, often referred to as an MDO machine. The series of rolls introduce orientation by having one or more middle pairs of these rollers turning at different speeds. The film stretches in the machine direction in the gap between the roller pairs. In some instances it may be desirable to introduce orientation in both directions. Both techniques can be used in combination to produce a film oriented in both the machine and transverse directions. The production of oriented film via cast film extrusion or sheet extrusion techniques, along with a TDO machine and, optionally, an MDO machine, is often referred to as a cast and tenter process.

In another embodiment, a shrink label of the present invention can be formed from a film containing (a) from about 50 parts by weight to about 95 parts by weight of a monovinylarene-conjugated diene block copolymer comprising a plurality of monovinylarene-conjugated diene mixed blocks, wherein each mixed block contains conjugated diene units and monovinylarene units in a weight ratio of about 0.05 to about 0.33; and optionally (b) from about 5 parts by weight to about 50 parts by weight of polystyrene; wherein the monovinylarene-conjugated diene block copolymer and the polystyrene total 100 parts by weight, to yield a shrink label.

A shrink label is a shrink film having a length, a width, and a thickness, wherein the length and the width are each at least an order of magnitude greater than the thickness and at least one of the length or the width will decrease upon exposure to heat. The term "shrink label" encompasses such a film portion before, during, or after heat exposure and decrease in the length or the width. Before heat exposure, the shrink label can be referred to as an "unshrunk shrink label" while also being a shrink label according to the definition given above. The length and width of the shrink label are not critical; the thickness can be any appropriate thickness, such as from about 0.1 mil to about 10 mil.

The shrink label can have a cylindrical structure. When the shrink label has a cylindrical structure, it can be termed a shrink sleeve.

Any geometry of the shrink label, in terms of size, shape, number of sides, radius, or the like, is contemplated, and will be matter of routine experimentation for the skilled artisan having the benefit of the present disclosure.

Generally, a shrink label oriented in the TD can be called a "sleeve label". In one embodiment, the sleeve label can be printed and slit in the MD direction. Solvent bonding can then be used to form a seam parallel to the TD and make a sleeve. The sleeve can be applied from the top of a container, resulting in the TD direction of the film around the circumference of the container. The materials making up a sleeve label can be chosen to have a desirable degree of shrinkage.

Generally, a shrink label oriented in the MD can be called a "roll fed" label. A roll fed label can be fed in the machine direction from a roll into a labeling machine. The labeling machine can wrap the roll fed label around a container, cut the roll fed label, and solvent bond the roll fed label, with the MD direction of the film around the circumference of the container.

In another embodiment, the present invention relates to a method of shrink-wrapping an object or a group of objects by wrapping the object or the group of objects with a film containing (a) from about 50 parts by weight to about 95 parts by weight of a monovinylarene-conjugated diene block copolymer comprising a plurality of monovinylarene-conjugated diene mixed blocks, wherein each mixed block contains conjugated diene and monovinylarene in a weight ratio of about 0.05 to about 0.33; and optionally (b) from about 5 parts by weight to about 50 parts by weight of polystyrene; wherein the monovinylarene-conjugated diene block copolymer and the polystyrene total 100 parts by weight, to yield a wrapped object or group of objects, and heating the wrapped object or group of objects to a temperature and for a duration sufficient to shrink the film in at least a first direction, to yield a shrink-wrapped object or group of objects.

The film can be as described above. In one embodiment, the film has a higher shrink in a first direction than in a second direction. If oriented in one direction, the first direction can be the machine direction or the transverse direction. The second direction would then be the other of the machine direction or the transverse direction.

In another embodiment, the film has a substantially similar shrink in both a first direction and a second direction. ("Substantially similar shrink" in this embodiment means the ratio of the shrink in the first direction to the shrink in the second direction is from about 0.5 to about 2).

Any object or group of objects for which wrapping is desired can be used in this method. In one embodiment, the object or group of objects is a group of bottles, cans, or other discrete objects, optionally contained in a tray.

In the wrapping step, the film can be disposed in a suitable manner around the object or group of objects. For example, if the object or group of objects define a cuboid, the film can be disposed around the object or group of objects such that it contacts at least two pairs of parallel sides, such as two or three pairs of parallel sides. The direction of disposing can be chosen as a routine matter for the skilled artisan having the benefit of the present disclosure, depending on the objects, the structure of the film, and the desired structure of the shrink-wrapped object or group of objects.

The result of the wrapping step is a wrapped object or group of objects.

After wrapping, the wrapped object or group of objects can be heated to a temperature and for a duration sufficient to shrink the film. The temperature and the duration are a matter of routine experimentation for the skilled artisan having the benefit of the present disclosure. Shrinking will typically proceed until the film has shrunk in at least the first direction and, if the film has substantially similar shrink in the second direction, also the second direction, to contact the object or group of objects.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Materials

Cyclohexane was dried over activated alumina and stored under nitrogen. n-Butyl lithium initiator ("Li") was received at about 15 wt % in cyclohexane and was diluted with cyclohexane to about 2 wt %. Tetrahydrofuran (THF) was stored over activated alumina under nitrogen. Styrene and butadiene were purified over activated alumina. Epoxidized soybean oil was used as received. Quantities of reagents are usually expressed in parts per hundred monomer (phm) based on the total weight of monovinylarene and conjugated diene employed.

Example 1

Polymer Recipes A-X

The polymerizations were performed in a 2-gallon stainless steel reactor. The reactor was equipped with a jacket for temperature control, a double auger impeller, and baffles. Generally, each block is formed by polymerizing the monomer or mixture of monomers from which the desired units of the block are derived.

Cyclohexane is initially charged to the reactor, followed by THF (0.10 PHM). The temperature is adjusted to about 60° C. and initiator is charged, followed by the first charge of monomer. After polymerization is complete a sample of the first polymerization block is coagulated in nitrogen-sparged isopropanol, filtered, dried, and analyzed by Gel Permeation Chromatography. The polymerization is continued by sequential charges of monomers and/or initiators as desired. The coupling agent is charged and reacted at about 100° C. for about 15 minutes. The polymer was recovered by solvent evaporation and pelletized with a single screw extruder.

Polymer Recipes Y-OO

Styrene/butadiene mixed block copolymers Y-OO were prepared employing sequential solution polymerization under nitrogen. Polymerization runs were carried out in a stirred, 100 gallon carbon steel reactor with internal cooling coils and employed essentially anhydrous reactants and conditions.

Cyclohexane was initially charged to the reactor, followed by THF. The temperature was adjusted to about 60° C. and initiator was charged, followed by the first charge. Lines were flushed with about 0.5 kg cyclohexane following each charge. Polymerization was allowed to continue to completion after each monomer or monomer mixture charge. Polymerization temperature ranged from about 38° C. to about 120° C. and pressure ranged from about 2 psig to about 60 psig. Total monomer weight was about 90 kg. Following completion of the sequential polymerizations, a coupling agent was charged to the reactor. The coupling agent was reacted at about 100° C. for about 15 minutes. After completion of coupling, the reaction was terminated by adding $CO_2$ and about 0.2 phm water.

The sequence of charges and a partial characterization of each polymer are shown in Table 1. All quantities of charged materials are given in phm. Blank cells indicate no material was charged or a value was not determined. The abbreviations in the table are as follows: THF, tetrahydrofuran; i, n-butyl lithium initiator; S, styrene; B, butadiene; CA, coupling agent (Vikoflex 7170, epoxidized soybean oil, Arkema, Inc.).

TABLE 1

| Ex. # | THF | $i_1$ | $S_0$ | $i_2$ | ($B_1$/ | $S_1$) | ($B_2$/ | $S_2$) | ($B_3$/ | $S_3$) | $i_3$ |
|---|---|---|---|---|---|---|---|---|---|---|---|
| A | 0.10 | 0.08 | | | 2.01 | 17.00 | 2.01 | 17.00 | 2.01 | 17.00 | 0.080 |
| B | 0.10 | 0.08 | | | 2.01 | 15.66 | 2.01 | 15.66 | 2.01 | 15.66 | 0.080 |
| C | 0.04 | 0.08 | | | 1.33 | 17.00 | 1.33 | 17.00 | 1.33 | 17.00 | 0.080 |
| D | 0.04 | 0.08 | | | 0.67 | 17.00 | 0.67 | 17.00 | 0.67 | 17.00 | 0.080 |
| E | 0.10 | 0.08 | | | 1.33 | 17.00 | 1.33 | 17.00 | 1.33 | 17.00 | 0.080 |
| F | 0.04 | 0.08 | | | 1.60 | 38.40 | 0.54 | 12.46 | | | 0.080 |
| G | 0.10 | 0.08 | | | 0.67 | 26.50 | 0.67 | 26.50 | | | 0.080 |
| H | 0.04 | 0.095 | 20 | | 2.1 | 12 | 2.1 | 12 | 2.1 | 12 | |
| I | 0.10 | 0.100 | 20 | | 1.7 | 13.75 | 1.7 | 13.75 | 1.7 | 13.75 | |
| J | 0.10 | 0.090 | 25 | | 1.7 | 13.75 | 1.7 | 13.75 | 1.7 | 13.75 | |
| K | 0.10 | 0.085 | 25 | | 2.1 | 13.75 | 2.1 | 13.75 | 2.1 | 13.75 | |
| L | 0.10 | 0.100 | 20 | | 2.1 | 13.75 | 2.1 | 13.75 | 2.1 | 13.75 | |
| M | 0.10 | 0.105 | 25 | | 1.6 | 12.5 | 1.6 | 12.5 | 1.6 | 12.5 | |
| N | 0.10 | 0.110 | 25 | | 1.9 | 12.5 | 1.9 | 12.5 | 1.9 | 12.5 | |
| O | 0.10 | 0.110 | 30 | | 1.4 | 11.25 | 1.4 | 11.25 | 1.4 | 11.25 | |
| P | 0.10 | 0.100 | 30 | | 1.7 | 11.25 | 1.7 | 11.25 | 1.7 | 11.25 | |
| Q | 0.10 | 0.090 | 30 | | 2 | 11.25 | 2 | 11.25 | 2 | 11.25 | |
| R | 0.10 | 0.110 | 30 | | 2.3 | 11.25 | 2.3 | 11.25 | 2.3 | 11.25 | |
| S | 0.10 | 0.085 | 30 | | 2.8 | 11.25 | 2.8 | 11.25 | 2.8 | 11.25 | |
| T | 0.04 | 0.066 | 32 | 0.025 | 1.89 | 13.5 | 1.89 | 13.5 | 10.11 | 9 | |
| U | 0.04 | 0.065 | 32 | 0.025 | 1.62 | 13.5 | 1.62 | 13.5 | 10.38 | 9 | |
| V | 0.04 | 0.065 | 32 | 0.025 | 1.62 | 13.5 | 2.15 | 13.5 | 10.12 | 9 | |
| W | 0.04 | 0.065 | 32 | 0.023 | 2.15 | 13.5 | 2.15 | 13.5 | 9.9 | 9 | |
| X | 0.04 | 0.065 | 32 | 0.022 | 2.15 | 13.5 | 1.62 | 13.5 | 10.12 | 9 | |
| Y | 0.10 | 0.0844 | | | 2.00 | 17.00 | 2.00 | 17.00 | 2.00 | 17.00 | 0.077 |
| Z | 0.10 | 0.085 | | | 2.00 | 17.00 | 2.00 | 17.00 | 2.00 | 17.00 | 0.040 |
| AA | 0.10 | 0.085 | | | 2.00 | 17.00 | 2.00 | 17.00 | 2.00 | 17.00 | 0.038 |
| BB | 0.10 | 0.085 | | | 1.70 | 17.00 | 1.70 | 17.00 | 1.70 | 17.00 | 0.040 |
| CC | 0.10 | 0.085 | | | 1.36 | 17.00 | 1.36 | 17.00 | 1.36 | 17.00 | 0.040 |
| DD | 0.10 | 0.085 | | | 2.00 | 17.00 | 2.00 | 17.00 | 2.00 | 17.00 | 0.035 |
| EE | 0.10 | 0.080 | | | 1.00 | 17.00 | 1.00 | 17.00 | 1.00 | 17.00 | 0.062 |
| FF | 0.10 | 0.085 | | | 1.19 | 17.00 | 1.19 | 17.00 | 1.19 | 17.00 | 0.060 |

TABLE 1-continued

| | | | | | | | | | | | |
|---|---|---|---|---|---|---|---|---|---|---|---|
| GG | 0.10 | 0.085 | | | 1.28 | 17.00 | 1.28 | 17.00 | 1.28 | 17.00 | 0.060 |
| HH | 0.10 | 0.085 | | | 1.36 | 17.00 | 1.36 | 17.00 | 1.36 | 17.00 | 0.060 |
| II | 0.10 | 0.077 | | | 1.36 | 17.00 | 1.36 | 17.00 | 1.36 | 17.00 | 0.044 |
| JJ | 0.10 | 0.077 | 17.00 | | 1.36 | 17.00 | 1.36 | 17.00 | | | 0.044 |
| KK | 0.04 | 0.085 | 20 | | 1.88 | 15 | 1.88 | 15 | 1.88 | 15 | |
| LL | 0.10 | 0.083 | 20 | | 2.1 | 13.75 | 2.1 | 13.75 | 2.1 | 13.75 | |
| MM | 0.10 | 0.087 | 30 | | 2.3 | 11.25 | 2.3 | 11.25 | 2.3 | 11.25 | |
| NN | 0.04 | 0.053 | 32 | 0.022 | 2.15 | 13.5 | 2.15 | 13.5 | 9.9 | 9 | |
| OO | 0.04 | 0.055 | 32 | 0.022 | 1.89 | 13.5 | 1.89 | 13.5 | 10.11 | 9 | |

| Ex. # | ($B_4$/$S_4$) | ($B_5$/$S_5$) | | $B_6$ | CA1 | CA2 | Melt Flow |
|---|---|---|---|---|---|---|---|
| A | 0.60 | 10.8 | 0.6 | 10.8 | 20.10 | 0.40 | | 40.0 |
| B | 0.60 | 10.4 | 0.6 | 10.4 | 25.00 | 0.40 | | 23.0 |
| C | 0.40 | 10.8 | 0.4 | 10.8 | 22.60 | 0.14 | 0.27 | 17.0 |
| D | 0.20 | 10.8 | 0.2 | 10.8 | 25.00 | 0.14 | 0.27 | 11.0 |
| E | 0.40 | 10.8 | 0.4 | 10.8 | 22.60 | 0.14 | 0.27 | 15.9 |
| F | 0.90 | 21.1 | | | 25.00 | 0.14 | 0.27 | 14.6 |
| G | 0.55 | 22 | | | 23.12 | 0.14 | 0.27 | 14.2 |
| H | 2.1 | 12 | 2.1 | 12 | 9.5 | 0.25 | | 8.7 |
| I | 1.7 | 13.75 | | | 18.2 | 0.28 | | 5.3 |
| J | 1.7 | 13.75 | | | 13.2 | 0.28 | | 8.6 |
| K | 2.1 | 13.75 | | | 11.6 | 0.28 | | 8.7 |
| L | 2.1 | 13.75 | | | 16.6 | 0.28 | | 6.7 |
| M | 1.6 | 12.5 | | | 18.6 | 0.28 | | 6.47 |
| N | 1.9 | 12.5 | | | 17.4 | 0.28 | | 7.3 |
| O | 1.4 | 11.25 | | | 19.4 | 0.28 | | 9 |
| P | 1.7 | 11.25 | | | 18.2 | 0.28 | | 11 |
| Q | 2 | 11.25 | | | 17 | 0.28 | | 9.5 |
| R | 2.3 | 11.25 | | | 15.8 | 0.28 | | 12 |
| S | 2.8 | 11.25 | | | 13.8 | 0.28 | | 8.6 |
| T | 9.11 | 9 | | | | 0.4 | | 5.2 |
| U | 9.38 | 9 | | | | 0.4 | | 5.7 |
| V | 9.11 | 9 | | | | 0.4 | | 6.5 |
| W | 8.8 | 9 | | | | 0.4 | | 6.1 |
| X | 9.11 | 9 | | | | 0.4 | | 4.5 |
| Y | 1.27 | 10.80 | 1.27 | 10.80 | 18.86 | 0.10 | 0.30 | 15.1 |
| Z | 1.27 | 10.80 | 1.27 | 10.80 | 18.86 | 0.20 | 0.20 | 12.8 |
| AA | 1.27 | 10.80 | 1.27 | 10.80 | 18.86 | 0.40 | | 14.4 |
| BB | 1.09 | 10.80 | 1.09 | 10.80 | 20.10 | 0.10 | 0.30 | 11.9 |
| CC | 0.79 | 10.80 | 0.79 | 10.80 | 22.60 | 0.10 | 0.30 | 10.5 |
| DD | 1.27 | 10.80 | 1.27 | 10.80 | 18.86 | 0.40 | | 8.8 |
| EE | 0.65 | 10.80 | 0.65 | 10.80 | 23.00 | 0.10 | 0.30 | 11.5 |
| FF | 0.76 | 10.80 | 0.76 | 10.00 | 22.30 | 0.40 | | 11 |
| GG | 0.81 | 10.80 | 0.81 | 10.00 | 21.90 | 0.40 | | 11.8 |
| HH | 0.86 | 10.80 | 0.86 | 10.00 | 21.60 | 0.40 | | 13.3 |
| II | 0.86 | 10.80 | 0.86 | 10.00 | 21.60 | 0.40 | | 12.6 |
| JJ | 0.86 | 10.80 | 0.86 | 10.00 | 22.96 | 0.40 | | 11.4 |
| KK | 1.88 | 15 | | | 12.5 | 0.23 | | 6.4 |
| LL | 2.1 | 13.75 | | | 16.6 | 0.28 | | 7.8 |
| MM | 2.3 | 11.25 | | | 15.6 | 0.28 | | 8.5 |
| NN | 8.8 | 9 | | | | 0.4 | | 8.4 |
| OO | 9.11 | 9 | | | | 0.4 | | 8.1 |

Example 2

A) Shrink Films A-S

In Table 2, pelletized products were extruded into sheets about 8" wide and about 10 mil thick on a Davis Standard 150S extruder fitted with a Killion sheet line. Plaques of about 12 cm×about 12 cm were die cut from the about 10-mil sheet samples to serve as film samples. Using a biaxial orienting machine manufactured by Bruckner Maschinenbau, films were normally uniaxially stretched in the direction transverse to the extrusion direction at the lowest temperature necessary to achieve a 5:1 extension. This temperature appears in Table 2 in the column labeled "StretchT". Sheet samples were stretched at a constant rate of about 3 cm/sec.

B) Shrink Films Y-KK

In Table 2, pelletized products were extruded into sheets about 10" wide and about 10 mil thick on a Killion extruder and sheet line. Mill rolls of the sheet were then fed to an Marshall & Williams Plastics tentoring frame and uniaxially stretched in the transverse direction at the lowest temperature that allowed an about 5:1 extension.

Representative physical properties of the shrink films are given in Table 2, including haze, transverse direction (TD) shrinkage at the temperature given (° C.), machine direction (MD) shrinkage at the temperature given (° C.), and natural shrinkage. Blank cells indicate a value was not determined. Heat shrinkage was determined by immersion of oriented films in an oil bath at a given temperature for about 30 seconds, whereafter the heat shrinkage was calculated. Natural Shrinkage was determined by placing the Oriented films in an oven set to about 40° C. for the number of days given. The haze was measured as % haze using a BYK-Gardner USA (Columbia, Md.) Haze-Gard® Plus instrument. Measurements were made in accordance with operating instructions of this instrument.

TABLE 2

| Ex. | StretchT | Haze | TD Shrinkage | | | | | | MD Shrinkage | | |
|---|---|---|---|---|---|---|---|---|---|---|---|
| | | | 60 | 70 | 80 | 90 | 100 | 120 | 60 | 70 | 80 |
| A | 65 | 6.3 | 4.9 | 30.0 | 56.3 | 70.8 | 72.2 | 74.9 | 0.0 | −1.0 | −2.2 |
| B | 65 | 12.7 | 6.2 | 37.0 | 54.5 | 68.6 | 72.1 | 71.1 | 0.0 | −6.3 | −2.9 |
| C | 80 | 9.4 | 0.5 | 9.9 | 35.0 | 68.6 | 69.6 | 75.4 | 0.0 | −0.7 | −4.0 |
| D | 95 | 5.1 | 0.0 | 0.0 | 2.7 | 13.0 | 39.2 | 66.2 | 0.0 | 0.0 | −0.3 |
| E | 80 | 10.9 | 0.0 | 4.3 | 23.3 | 48.5 | 65.5 | 75.3 | 0.0 | 0.0 | −1.7 |
| F | 90 | 9.5 | 0.0 | 0.7 | 7.3 | 22.3 | 42.8 | 69.7 | 0.0 | 0.0 | 0.0 |
| G | 105 | 9.7 | 0.0 | 0.0 | 0.0 | 2.8 | 20.5 | 66.7 | 0.0 | 0.0 | 0.0 |
| H | 70 | 10.6 | 15.0 | 40.0 | 68.0 | 73.0 | 75.0 | 77.0 | 0.0 | −3.0 | −8.0 |
| I | 70 | 6.16 | 7.5 | 35.0 | 59.2 | 73.3 | 75.0 | 75.0 | 0.0 | −0.8 | −5.0 |
| J | 75 | 2.35 | 0.0 | 5.0 | 22.5 | 69.2 | 75.8 | 77.5 | 0.0 | 0.0 | 0.8 |
| K | 80 | 7.33 | 0.0 | 7.5 | 39.2 | 71.7 | 75.8 | 77.5 | 0.0 | 0.0 | 0.0 |
| L | 70 | 2.56 | 8.3 | 34.2 | 65.8 | 75.0 | 75.0 | 76.7 | −0.8 | −1.7 | −8.3 |
| M | 75 | 0.86 | 0.0 | 9.2 | 38.3 | 61.7 | 75.0 | 77.5 | 0.0 | 0.0 | −0.8 |
| N | 70 | 2.48 | 1.7 | 16.7 | 45.0 | 70.0 | 75.8 | 75.8 | 0.0 | 0.0 | 4.2 |
| O | 70 | 3.14 | 0.0 | 25.0 | 51.7 | 71.7 | 74.2 | 75.0 | 0.0 | −1.7 | −5.0 |
| P | 70 | 1.97 | 3.3 | 28.3 | 55.0 | 71.7 | 74.2 | 75.0 | 0.0 | −1.7 | −3.3 |
| Q | 70 | 0.75 | 3.3 | 15.8 | 49.2 | 72.5 | 75.0 | 77.5 | 0.0 | 0.0 | −3.3 |
| R | 70 | 2.33 | 1.7 | 26.7 | 57.5 | 73.3 | 75.0 | 75.8 | 0.0 | −1.7 | −7.5 |
| S | 70 | 4.79 | 9.2 | 41.7 | 58.3 | 69.2 | 72.5 | 74.2 | 0.0 | −1.7 | −9.2 |
| Y | 70 | 5.9 | 12.0 | 60.0 | 70.0 | 73.0 | 75.0 | 77.0 | 0 | 3.0 | 10.0 |
| Z | 60 | 4.7 | 25.0 | 50.0 | 67.0 | 73.0 | 73.0 | 75.0 | 0 | 2.0 | 5.0 |
| AA | 60 | 5.3 | 30.0 | 52.0 | 65.0 | 70.0 | 73.0 | 75.0 | 5 | 2.0 | 7.0 |
| BB | 70 | 4.3 | 13.0 | 38.0 | 65.0 | 72.0 | 73.0 | 75.0 | 0 | 2.0 | 3.0 |
| CC | 75 | 3.0 | 7.0 | 23.0 | 50.0 | 70.0 | 73.0 | 75.0 | 0 | 3.0 | 7.0 |
| DD | 65 | 5.7 | 26.7 | 54.2 | 68.3 | 72.5 | 75.0 | 75.0 | 0 | 1.7 | 5.0 |
| EE | 95 | 3.6 | 0.0 | 1.7 | 14.2 | 42.5 | 65.8 | 75.8 | 0 | 0.0 | 3.3 |
| FF | 85 | 3.35 | 0.0 | 19.2 | 39.2 | 60.0 | 70.0 | 75.0 | 0 | 0.0 | 3.3 |
| GG | 85 | 3.57 | 0.8 | 9.2 | 37.5 | 65.0 | 74.2 | 75.0 | 0 | 0.8 | 2.5 |
| HH | 85 | 4.03 | 3.3 | 19.2 | 45.8 | 67.5 | 74.2 | 75.0 | 0 | 0.0 | 1.7 |
| KK | 85 | 1.5 | 0.0 | 14.2 | 38.3 | 58.3 | 74.2 | 79.2 | 0.0 | 0.8 | 6.7 |

| Ex. | MD Shrinkage | | | Natural Shrinkage | | | | |
|---|---|---|---|---|---|---|---|---|
| | 90 | 100 | 120 | 1 | 2 | 3 | 7 | 14 |
| A | −1.3 | 10.5 | 11.5 | | | | | |
| B | −3.5 | 0.5 | 5.3 | | | | | |
| C | −5.8 | 6.5 | 6.7 | | | | | |
| D | 0.0 | −1.8 | 17.0 | | | | | |
| E | −2.3 | −6.8 | 7.8 | | | | | |
| F | −0.7 | −1.3 | 16.2 | | | | | |
| G | 0.0 | −2.0 | −5.8 | | | | | |
| H | −8.0 | −7.0 | 2.0 | | | | | |
| I | −1.7 | 4.2 | 12.5 | | | | | |
| J | −5.0 | −0.8 | 1.7 | | | | | |
| K | −10.8 | −8.3 | −6.7 | | | | | |
| L | 9.2 | 0.0 | 10.0 | | | | | |
| M | −4.2 | −3.3 | 0.0 | | | | | |
| N | −3.3 | −0.8 | 5.8 | | | | | |
| O | −4.2 | −3.3 | 1.7 | | | | | |
| P | −5.8 | −4.2 | 0.8 | | | | | |
| Q | −7.5 | −5.0 | −4.2 | | | | | |
| R | −9.2 | −5.8 | 2.5 | | | | | |
| S | −0.8 | −1.7 | 11.7 | | | | | |
| Y | 25.0 | 18.0 | 32 | | | | | |
| Z | 12.0 | 22.0 | 28 | | | | | |
| AA | 17.0 | 12.0 | 18 | | | | | |
| BB | 10.0 | 15.0 | 23 | | | | | |
| CC | 18.0 | 22.0 | 32 | 8.66 | 10.2 | 11.4 | 13.78 | 15.35 |
| DD | 14.2 | 19.2 | 27.5 | 20.63 | 25.3 | 27.7 | 32.61 | |
| EE | 8.3 | 22.5 | 40.8 | 1.77 | 2.4 | 2.8 | 3.73 | |
| FF | 7.5 | 19.2 | 36.7 | | | | 8.5 | |
| GG | 2.5 | 14.2 | 20.8 | | | | 7.7 | |
| HH | 4.2 | 16.7 | 25.8 | | | | 11.4 | |
| KK | 13.3 | 25.8 | 35.8 | 3.7 | 4.5 | 4.9 | 6.9 | 7.5 |

Example 3

Shrink Films Containing Polymer and Polystyrene

Shrink films (about 2 mil nominal thickness) were made from the polymers I-OO, blended with about 0 wt % or about 20 wt % polystyrene and about 0 wt % or about 2 wt % high impact polystyrene (HIPS) as an antiblocking agent. The polystyrene used was EA3710 and the HIPS used was EA8100, both available from Chevron Phillips Chemical Company LP, The Woodlands, Tex. The shrink films I-X were prepared and tested using the same methods as used for the unblended resins described in Example 2A). The shrink films DD-OO were prepared and tested using the same methods as used for the unblended resins described in Example 2B).

TABLE 3

| Ex. | % PS | % HIPS | StretchT | Haze | TD Shrinkage 60 | 70 | 80 | 90 | 100 | 120 | MD Shrinkage 60 | 70 |
|---|---|---|---|---|---|---|---|---|---|---|---|---|
| I | 20 | 0 | 95 | 1.51 | 0.0 | 0.0 | 12.5 | 35.0 | 58.3 | 70.8 | 0.0 | 0.0 |
| J | 20 | 0 | 95 | 1.07 | 0.0 | 0.0 | 5.0 | 17.5 | 50.0 | 75.0 | 0.0 | 0.0 |
| K | 20 | 0 | 90 | 3.02 | 0.0 | 0.0 | 8.3 | 31.7 | 63.3 | 75.0 | 0.0 | 0.0 |
| L | 20 | 0 | 85 | 2.54 | 0.0 | 9.2 | 37.5 | 61.7 | 69.2 | 75.0 | 0.0 | 0.0 |
| M | 20 | 0 | 100 | 0.92 | 0.0 | 0.0 | 0.0 | 14.2 | 40.8 | 70.8 | 0.0 | 0.0 |
| N | 20 | 0 | 95 | 1.21 | 0.0 | 0.8 | 4.2 | 26.7 | 49.2 | 72.5 | 0.0 | 0.0 |
| O | 20 | 0 | 100 | 1.13 | 0.0 | 0.0 | 2.5 | 15.8 | 46.7 | 70.8 | 0.0 | 0.0 |
| P | 20 | 0 | 95 | 2.73 | 0.0 | 0.0 | 5.0 | 27.5 | 56.7 | 74.2 | 0.0 | 0.0 |
| Q | 20 | 0 | 95 | 3.19 | 0.0 | 1.7 | 11.7 | 35.8 | 46.7 | 71.7 | 0.0 | 0.8 |
| R | 20 | 0 | 85 | 2.44 | 0.0 | 5.0 | 17.5 | 47.5 | 61.7 | 75.0 | 0.0 | 0.0 |
| S | 20 | 0 | 85 | 6.6 | 0.0 | 5.8 | 29.2 | 55.0 | 60.8 | 72.5 | 0.0 | 0.0 |
| T | 20 | 0 | 75 | 4.51 | 2.5 | 18.3 | 40.0 | 60.0 | 70.0 | 74.2 | 0.0 | 0.0 |
| U | 20 | 0 | 90 | 5.5 | 0.8 | 7.5 | 20.0 | 41.7 | 60.8 | 72.5 | 0.0 | 0.0 |
| V | 20 | 0 | 90 | 3.58 | 0.0 | 5.0 | 20.0 | 36.7 | 64.2 | 70.0 | 0.0 | 0.0 |
| W | 20 | 0 | 75 | 4.01 | 3.3 | 15.8 | 37.5 | 55.0 | 70.8 | 75.0 | 0.0 | 0.0 |
| X | 20 | 0 | 90 | 5.54 | 1.7 | 5.8 | 21.7 | 40.0 | 56.7 | 74.2 | 0.0 | 0.0 |
| DD | 20 | 2 | 75 | 33.6 | 10 | 25.8 | 45 | 63.3 | 72.5 | 75 | 0 | 0 |
| EE | 20 | 2 | 100 | 12.4 | 0 | 0 | 8.3 | 39.2 | 57.5 | 74.2 | 0 | 0 |
| FF | 20 | 2 | 90 | 15.9 | 0 | 7.5 | 26.7 | 50.8 | 68.3 | 75.8 | 0 | 0 |
| GG | 20 | 2 | 95 | 18.8 | 0 | 9.2 | 25.8 | 48.3 | 66.7 | 73.3 | 0 | 0 |
| HH | 20 | 2 | 95 | 24.3 | 0 | 7.5 | 25.8 | 50 | 69.2 | 74.2 | 0 | 0 |
| II | 0 | 2 | 85 | 3.2 | 0 | 5.0 | 33.0 | 54.0 | 68.0 | 75.0 | | |
| JJ | 0 | 2 | 88 | 2.2 | 0 | 3 | 27 | 47 | 66 | 75 | | |
| JJ | 20 | 2 | 99 | 10.1 | 0.0 | 2.0 | 9.0 | 20.0 | 48.0 | 73.0 | | |
| KK | 20 | 2 | 90 | 7.2 | 0.0 | 6.7 | 25.0 | 47.5 | 68.3 | 75.8 | 0.0 | 0.0 |
| LL | 20 | 2 | 91 | 8 | 0.0 | 13.0 | 24.0 | 56.0 | 71.0 | 77.0 | | |
| MM | 20 | 2 | 85 | 7.6 | 0.0 | 14.0 | 38.0 | 66.0 | 72.0 | 78.0 | | |
| NN | 20 | 2 | 77 | 8.3 | 12.0 | 28.0 | 50.0 | 68.0 | 73.0 | 75.0 | | |
| OO | 20 | 2 | 74 | 4.7 | 4.0 | 15.0 | 35.0 | 48.0 | 63.0 | 73.0 | | |

| Ex. | MD Shrinkage 80 | 90 | 100 | 120 | Natural Shrinkage 1 | 2 | 3 | 7 | 14 |
|---|---|---|---|---|---|---|---|---|---|
| I | −0.8 | −4.2 | −5.0 | 13.3 | | | | | |
| J | 0.0 | 1.7 | 0.0 | −1.7 | | | | | |
| K | 0.0 | 0.0 | −7.5 | −2.5 | | | | | |
| L | −3.3 | −9.2 | −5.0 | −4.2 | | | | | |
| M | 0.0 | 2.5 | −0.8 | 0.0 | | | | | |
| N | 0.0 | 0.0 | −5.0 | 8.3 | | | | | |
| O | 0.0 | 0.8 | −5.0 | −7.5 | | | | | |
| P | 0.0 | 0.0 | −8.3 | −5.8 | | | | | |
| Q | 0.0 | −4.2 | −4.2 | −7.5 | | | | | |
| R | 0.0 | −4.2 | −4.2 | −2.5 | | | | | |
| S | −0.8 | −4.2 | −4.2 | 0.0 | | | | | |
| T | −3.3 | −5.0 | −5.0 | 0.0 | | | | | |
| U | −1.7 | −4.2 | −4.2 | −2.5 | | | | | |
| V | −0.8 | −2.5 | −5.0 | −3.3 | | | | | |
| W | −0.8 | −3.3 | −3.3 | 0.0 | | | | | |
| X | 0.0 | −2.5 | −3.3 | −0.8 | | | | | |
| DD | 0 | −2.5 | 0 | 10 | 12.55 | 15.69 | 17.65 | 20.98 | |
| EE | 0 | 0 | 6.7 | 25.8 | 0.98 | 1.18 | 1.38 | 1.96 | |
| FF | 2.5 | 2.5 | −1.7 | 9.2 | | | | 7.23 | |
| GG | 0 | 0.8 | 2.5 | 30.8 | | | | 5.7 | |
| HH | 0.8 | 0.8 | 0.8 | 17.5 | | | | 6.08 | |
| II | 3.0 | | 22.0 | | | | | 4.0 | |
| JJ | 5 | | 23 | | | | | 3 | |
| JJ | 2.0 | | 11.0 | | | | | 2.0 | |
| KK | 3.3 | 5.0 | 8.3 | 23.3 | 2.4 | 2.9 | 3.1 | 4.5 | 5.1 |
| LL | 3.0 | | 3.0 | | | | | 3.0 | |
| MM | 0.0 | | 0.0 | | | | | 6.0 | |
| NN | −2.0 | | 1.0 | | | | | 19.0 | |
| OO | −1.0 | | 9.0 | | | | | 13.0 | |

All of the compositions disclosed and claimed herein can be made and executed without undue experimentation in light of the present disclosure. While the compositions and methods of this invention have been described in terms of preferred embodiments, it will be apparent to those of skill in the art that variations may be applied to the compositions described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A monovinylarene-conjugated diene block copolymer formed through a charge order selected from the group consisting of: i-A-C-C-C-C-B-CA, i-A-i-C-C-C-C-B-CA, and i-A-i-C-C-C-C-C-B-CA, wherein:
  i is a polymerization initiator charge;
  A is a monovinylarene charge comprising from about 10 phm to about 40 phm monovinylarene units;
  B is a conjugated diene charge comprising from about 5 phm to about 50 phm conjugated diene units;
  C is a monovinylarene-conjugated diene charge, each C comprising a weight ratio of conjugated diene units to monovinylarene units from about 0.05 to about 0.33; and
  CA is a coupling agent charge.

2. The monovinylarene-conjugated diene block copolymer of claim 1, wherein the weight ratio of conjugated diene units to monovinylarene units is from about 0.08 to about 0.26.

3. The monovinylarene-conjugated diene block copolymer of claim 1, wherein:
  A comprises from about 15 phm to about 35 phm monovinylarene units; and
  B comprises from about 11 phm to about 25 phm conjugated diene units.

4. The monovinylarene-conjugated diene block copolymer of claim 1, wherein the monovinylarene-conjugated diene block copolymer is formed through the charge order i-A-C-C-C-C-B-CA.

5. The monovinylarene-conjugated diene block copolymer of claim 4, wherein:
  A comprises from about 15 phm to about 35 phm monovinylarene units;
  B comprises from about 11 phm to about 25 phm conjugated diene units; and
  the weight ratio of conjugated diene units to monovinylarene units is from about 0.06 to about 0.28.

6. The monovinylarene-conjugated diene block copolymer of claim 5, wherein the monovinylarene-conjugated diene block copolymer is a styrene-butadiene block copolymer.

7. The monovinylarene-conjugated diene block copolymer of claim 1, wherein the monovinylarene-conjugated diene block copolymer is formed through the charge order i-A-i-C-C-C-C-B-CA.

8. The monovinylarene-conjugated diene block copolymer of claim 7, wherein:
  A comprises from about 15 phm to about 35 phm monovinylarene units;
  B comprises from about 11 phm to about 25 phm conjugated diene units; and
  the weight ratio of conjugated diene units to monovinylarene units is from about 0.06 to about 0.28.

9. The monovinylarene-conjugated diene block copolymer of claim 8, wherein the monovinylarene-conjugated diene block copolymer is a styrene-butadiene block copolymer.

10. The monovinylarene-conjugated diene block copolymer of claim 1, wherein the monovinylarene-conjugated diene block copolymer is formed through the charge order i-A-i-C-C-C-C-C-B-CA.

11. The monovinylarene-conjugated diene block copolymer of claim 10, wherein:
  A comprises from about 15 phm to about 35 phm monovinylarene units;
  B comprises from about 11 phm to about 25 phm conjugated diene units; and
  the weight ratio of conjugated diene units to monovinylarene units is from about 0.06 to about 0.28.

12. The monovinylarene-conjugated diene block copolymer of claim 11, wherein the monovinylarene-conjugated diene block copolymer is a styrene-butadiene block copolymer.

13. A shrink film comprising:
  (a) from about 5 to about 50 wt. % of a polystyrene; and
  (b) a monovinylarene-conjugated diene block copolymer formed through a charge order selected from the group consisting of: i-A-C-C-C-C-B-CA, i-A-i-C-C-C-C-B-CA, and i-A-i-C-C-C-C-C-B-CA, wherein:
    i is a polymerization initiator charge;
    A is a monovinylarene charge comprising from about 10 phm to about 40 phm monovinylarene units;
    B is a conjugated diene charge comprising from about 5 phm to about 50 phm conjugated diene units;
    C is a monovinylarene-conjugated diene charge, each C comprising a weight ratio of conjugated diene units to monovinylarene units from about 0.05 to about 0.33; and
    CA is a coupling agent charge; and
  wherein the shrink film has a thickness in a range from about 0.1 to about 10 mils, a shrinkage in at least one direction of at least about 60% at 100° C., and a haze of less than about 10%.

14. The shrink film of claim 13, wherein:
  A comprises from about 15 phm to about 35 phm monovinylarene units;
  B comprises from about 11 phm to about 25 phm conjugated diene units; and
  the weight ratio of conjugated diene units to monovinylarene units is from about 0.06 to about 0.28.

15. The shrink film of claim 14, wherein the monovinylarene-conjugated diene block copolymer is a styrene-butadiene block copolymer.

16. The shrink film of claim 15, wherein the shrink film has a thickness is a range from about 0.5 to about 3 mils, and a haze of less than about 6%.

17. The shrink film of claim 15, wherein the shrink film has a shrinkage in at least one direction of at least about 70% at 100° C.

18. The shrink film of claim 13, wherein the monovinylarene-conjugated diene block copolymer is a styrene-butadiene block copolymer.

19. The shrink film of claim 18, wherein the monovinylarene-conjugated diene block copolymer is formed through the charge order i-A-C-C-C-C-B-CA.

20. The shrink film of claim 18, wherein the monovinylarene-conjugated diene block copolymer is formed through the charge order i-A-i-C-C-C-C-B-CA.

21. The shrink film of claim 18, wherein the monovinylarene-conjugated diene block copolymer is formed through the charge order i-A-i-C-C-C-C-C-B-CA.

* * * * *